United States Patent
Konno

(10) Patent No.: US 10,086,896 B2
(45) Date of Patent: Oct. 2, 2018

(54) SADDLE-RIDE TYPE VEHICLE

(71) Applicant: SUZUKI MOTOR CORPORATION, Hamamatsu-Shi, Shizuoka (JP)

(72) Inventor: Takeshi Konno, Hamamatsu (JP)

(73) Assignee: SUZUKI MOTOR CORPORATION, Hamamatsu-Shi, Shizuoka (JP)

(*) Notice: Subject to any disclaimer, the term of this patent is extended or adjusted under 35 U.S.C. 154(b) by 0 days.

(21) Appl. No.: 15/056,360

(22) Filed: Feb. 29, 2016

(65) Prior Publication Data
US 2016/0318570 A1 Nov. 3, 2016

(30) Foreign Application Priority Data

Apr. 30, 2015 (JP) .................... 2015-093161

(51) Int. Cl.
F02P 1/02 (2006.01)
B62J 17/00 (2006.01)
B62K 11/04 (2006.01)
B62K 19/30 (2006.01)

(52) U.S. Cl.
CPC .............. *B62J 17/00* (2013.01); *B62K 11/04* (2013.01); *B62K 19/30* (2013.01)

(58) Field of Classification Search
CPC .......... B62J 17/00; B62K 11/04; B62K 19/30; B60K 11/00; B60K 11/06; B60K 11/08
USPC ....................................... 180/68.1
See application file for complete search history.

(56) References Cited

U.S. PATENT DOCUMENTS

| 4,793,293 | A |   | 12/1988 | Minami |             |
|-----------|---|---|---------|--------|-------------|
| 4,830,135 | A | * | 5/1989  | Yamashita | B60K 11/08 |
|           |   |   |         |        | 123/41.7    |
| 4,964,484 | A | * | 10/1990 | Buell  | B60K 11/08  |
|           |   |   |         |        | 180/219     |
| 5,301,767 | A |   | 4/1994  | Shiohara |           |
| 6,105,701 | A | * | 8/2000  | Buell  | B62J 35/00  |
|           |   |   |         |        | 180/229     |

(Continued)

FOREIGN PATENT DOCUMENTS

| DE | 3831792 A1    | 3/1990 |
|----|---------------|--------|
| DE | 102008028321 A1 | 1/2009 |

(Continued)

OTHER PUBLICATIONS

German Office Action dated Jan. 12, 2018 during the prosecution of DE10 2016 104 123.8 with English translation.

(Continued)

*Primary Examiner* — Tony H Winner
(74) *Attorney, Agent, or Firm* — Troutman Sanders LLP

(57) ABSTRACT

In an outside air intake duct, a duct body extends intersecting with a part of a vehicle body frame in a top view of a vehicle body. The vehicle body frame includes a duct holding portion. The duct holding portion is formed so as to surround the duct body at an intersecting site with the duct body. The duct body includes an air intake opening and a discharge port. The air intake opening projects outside the vehicle body frame. The discharge port is positioned inside the vehicle body frame. The duct holding portion includes a plurality of duct securing portions to secure the duct body. The duct securing portions are disposed so as to be positioned on both sides of the duct body nipping the duct body.

10 Claims, 8 Drawing Sheets

(56) References Cited

U.S. PATENT DOCUMENTS

| | | | |
|---|---|---|---|
| 6,422,332 B1* | 7/2002 | Takata | F02B 61/02 123/41.01 |
| 6,695,088 B2* | 2/2004 | Schroeder | B62J 17/00 180/229 |
| 7,331,322 B2* | 2/2008 | Seki | F02M 35/10013 123/184.21 |
| 8,950,799 B2* | 2/2015 | Yokouchi | B62J 17/06 296/180.1 |
| 9,016,414 B2* | 4/2015 | Shimomura | F02M 35/02416 180/68.3 |
| 9,347,406 B2* | 5/2016 | Abe | B62K 19/48 |
| 9,568,023 B2* | 2/2017 | Naruoka | F02B 39/04 |
| 2007/0144802 A1 | 6/2007 | Tsuya | |
| 2008/0314671 A1 | 12/2008 | Buell | |
| 2010/0294581 A1* | 11/2010 | Niijima | B60K 13/02 180/219 |
| 2011/0155495 A1* | 6/2011 | Matsuda | B62K 11/04 180/219 |
| 2011/0232983 A1* | 9/2011 | Abe | B01D 46/0005 180/68.3 |
| 2013/0081896 A1 | 4/2013 | Nakamura | |
| 2013/0100689 A1* | 4/2013 | Ohashi | B62J 6/02 362/476 |
| 2015/0034405 A1* | 2/2015 | Abe | B62K 19/48 180/219 |
| 2015/0101558 A1* | 4/2015 | Shimozato | F02M 35/162 123/184.21 |
| 2015/0159604 A1* | 6/2015 | Nishimura | B62K 11/04 123/198 E |
| 2016/0076494 A1* | 3/2016 | Nishimura | B62K 11/00 180/219 |
| 2016/0244116 A1* | 8/2016 | Komatsu | B62J 23/00 |
| 2016/0244119 A1* | 8/2016 | Ishida | B62K 11/04 |
| 2016/0273442 A1* | 9/2016 | Matsuo | B62K 11/04 |

FOREIGN PATENT DOCUMENTS

| | | |
|---|---|---|
| EP | 0317093 A2 | 5/1989 |
| EP | 0441461 A2 | 8/1991 |
| JP | H01111590 A | 4/1989 |
| JP | H01175585 A | 7/1989 |
| JP | H0656060 A | 3/1994 |
| JP | 2007145130 A | 6/2007 |

OTHER PUBLICATIONS

Reasons for Rejection dated Jun. 12, 2018 during the prosecution of Japanese Patent Application No. 2015-093161.

* cited by examiner

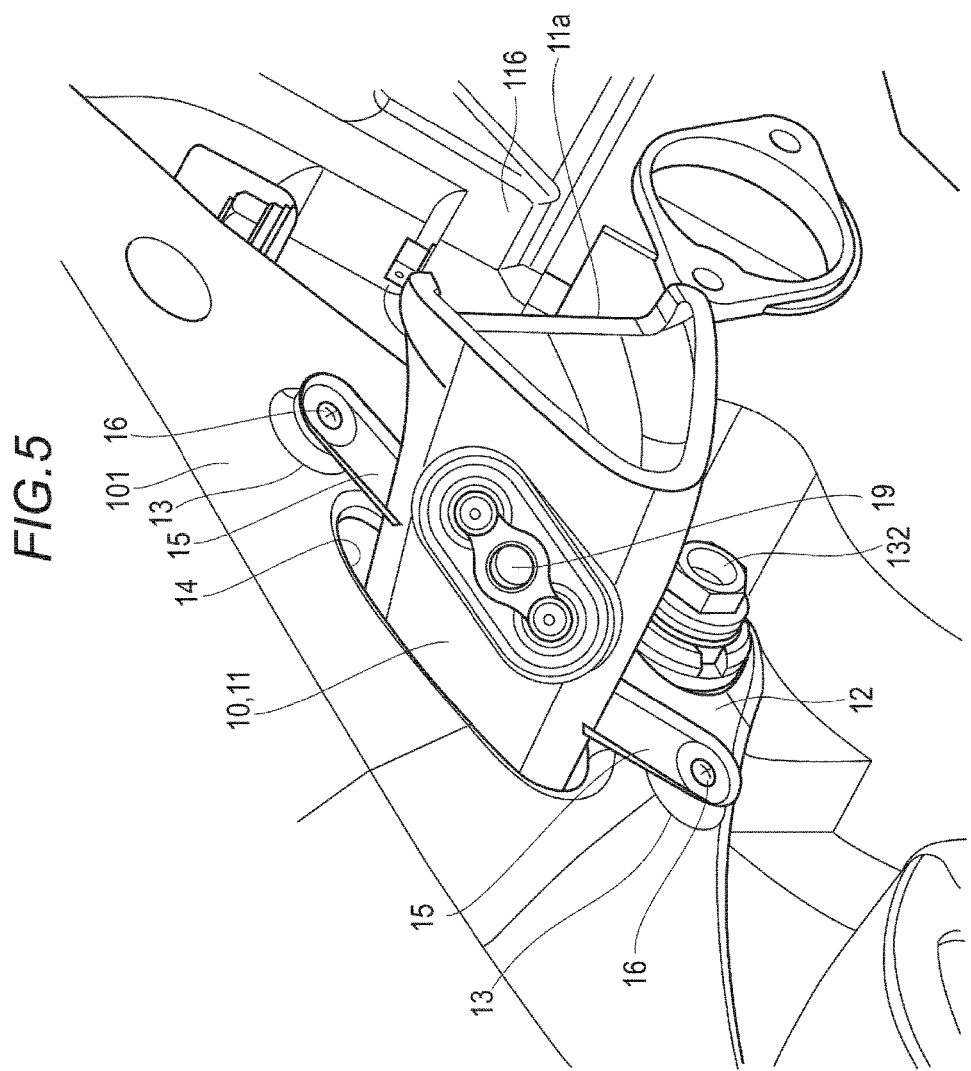

SADDLE-RIDE TYPE VEHICLE

CROSS-REFERENCE TO RELATED APPLICATION

This application is based upon and claims the benefit of priority of the prior Japanese Patent Application No. 2015-093161, filed on Apr. 30, 2015, the entire contents of which are incorporated herein by reference.

BACKGROUND OF THE INVENTION

Field of the Invention

The present invention typically relates to a saddle-ride type vehicle for motorcycles or similar vehicles, especially relates to a saddle-ride type vehicle that includes a duct for cooling.

Description of the Related Art

Conventionally, there is provided a method that, to cool vehicle components disposed at sites where travelling air does not blow in motorcycles or similar vehicles using travelling air, the travelling air is guided to the vehicle components with a dedicated duct. As described in Patent Document 1, the technique that performs cooling dispensing with a duct has been known.

The use of dedicated duct increases the number of components and the weight. Further, the restriction in a degree of freedom for component layout possibly makes it difficult to establish the dedicated duct itself. According to Patent Document 1, the problems are configured to be solved.
Patent Document 1: Japanese Laid-open Patent Publication No. 2007-145130

However, with the technique described in Patent Document 1, the passage to guide travelling air to the target components is unclear. Accordingly, compared with the case of using the dedicated duct, to obtain sufficient cooling effect, a large amount of travelling air needs to be taken in and circulated. Without these operations, this results in an increase in air resistance, that is, involving an increase in travelling resistance. The front portion of the air duct is coupled to the opening formed on the front end of the cowl and the rear portion is coupled to an introduction portion of the air cleaner. This never makes the support rigidity sufficient.

SUMMARY OF THE INVENTION

To solve the actual conditions, an object of the present invention is to provide a saddle-ride type vehicle with a duct structure featuring both excellent support rigidity and excellent cooling effect.

A saddle-ride type vehicle of the present invention includes a vehicle body frame and an outside air intake duct. The vehicle body frame includes a right and left pair of main frames. The main frames extend from a rear portion of a head pipe to a rear. The head pipe is positioned outside a vehicle body. The outside air intake duct takes in air flowing at the outside of the vehicle body and guides the air to an inside of the vehicle body. The outside air intake duct includes a duct body that extends intersecting with a part of the vehicle body frame in a top view of the vehicle body. The vehicle body frame includes a duct holding portion. The duct holding portion is formed so as to surround the duct body at an intersecting site with the duct body. The duct body includes an air intake opening and a discharge port. The air intake opening projects outside the vehicle body frame. The discharge port is positioned inside the vehicle body frame.

The duct holding portion includes a plurality of duct securing portions to secure the duct body. The duct securing portions are disposed so as to be positioned on both sides of the duct body nipping the duct body.

The saddle-ride type vehicle of the present invention is configured as follows. The outside air intake duct extends in a vehicle body width direction in the top view of the vehicle body. The duct body intersects with at least one of the right and left main frames. The air intake opening opens to an outer lateral side of the main frame. The main frame includes the duct holding portion.

The saddle-ride type vehicle of the present invention is configured as follows. In the duct holding portion, the duct securing portions are formed so as to be approximately opposed on both sides of a cross section of an intake passage of the duct body.

The saddle-ride type vehicle of the present invention is configured as follows. One of the duct securing portions is formed so as to be positioned on a front side of the duct body. The other duct securing portion is positioned on a rear side of the duct body.

The saddle-ride type vehicle of the present invention is configured as follows. The main frame is formed such that the duct holding portion covers a whole circumference of the duct body in a closed curved line shape.

The saddle-ride type vehicle of the present invention is configured as follows. In the main frame, the duct holding portion forms an engine supporting portion to support an engine. The duct holding portion is formed into an approximately triangular shape so as to cover a whole circumference of the duct body.

The saddle-ride type vehicle of the present invention includes an exterior member. The exterior member includes an inlet. The inlet takes in air flowing at the outside of the vehicle body. The air intake opening of the duct body communicates with the inlet of the exterior member. The duct body includes an exterior member securing portion to secure the exterior member.

BRIEF DESCRIPTION OF THE DRAWINGS

FIG. 5 is a perspective view illustrating the periphery of the outside air intake duct mounted to the vehicle body frame according to the embodiment of the present invention;

DETAILED DESCRIPTION OF THE PREFERRED EMBODIMENTS

Figure 1:
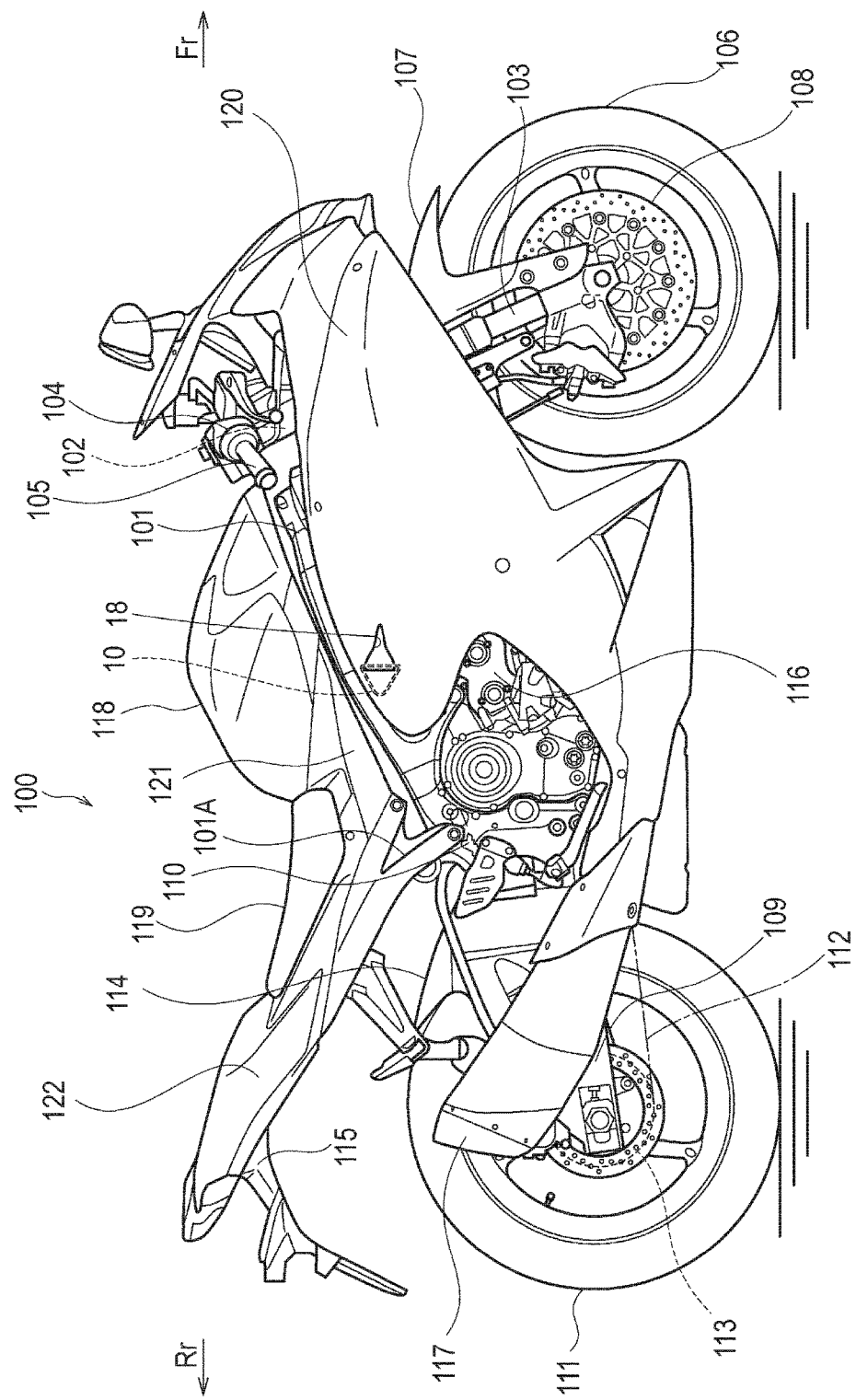
FIG. 1 is a side view of a saddle-ride type vehicle according to an embodiment of the present invention.

The following describes preferred embodiments of a saddle-ride type vehicle according to the present invention with reference to the drawings. FIG. 1 is a side view of a motorcycle 100 as an application example of the saddle-ride type vehicle according to the present invention. First, using FIG. 1, the following describes the overall configuration of the motorcycle 100. Including FIG. 1, the drawings used in the following description indicate the front side of the vehicle by an arrow Fr and the rear side of the vehicle by an arrow Rr as necessary. Additionally, an arrow R indicates the right lateral side of the vehicle while an arrow L indicates the left lateral side of the vehicle.

In FIG. 1, on the front portion of a vehicle body frame 101 (a main frame), which is made of steel or an aluminum alloy material, two front forks 103 are disposed on the right and left. The front forks 103 are turnably supported by a steering head pipe 102 to the right and left. A handlebar 104 is secured to the upper ends of the front forks 103. The handlebar 104 includes grips 105 on both ends. On the lower portion of the front forks 103, a front wheel 106 is rotatably supported. A front fender 107 is secured so as to cover the upper portion of the front wheel 106. The front wheel 106 includes a brake disc 108, which rotates integrally with the front wheel 106.

The vehicle body frame 101 is integrally joined to the rear portion of the steering head pipe 102 and is branched into two of right and left pair to the rear. The vehicle body frame 101 is disposed to extend widening from the steering head pipe 102 downward to the rear. This example employs a so-called twin-spar frame, which is used preferably for vehicles where high-speed performance is required. A seat rail 101A is appropriately inclined from the vicinity of the rear portion of the vehicle body frame 101 upward to the rear and extends to the rear to support a seat, which will be described later. To the rear portion of the vehicle body frame 101, a swing arm 109 is swingably joined. A rear shock absorber 110 is installed in a predetermined manner between the vehicle body frame 101 and the swing arm 109. To the rear end of the swing arm 109, a rear wheel 111 is rotatably supported. The rear wheel 111 is rotatively driven via a driven sprocket 113 around which a chain 112, which transmits power of an engine, which will be described later, is wound. At the peripheral area immediately close to the rear wheel 111, an inner fender 114, which covers near the front upper portion of the rear wheel 111, is disposed. Above the inner fender 114, a rear fender 115 may be disposed.

An air-fuel mixture, which consists of air and fuel and is to be supplied, is supplied from respective air cleaner and fuel supply device (not illustrated) to an engine unit 116 mounted to the vehicle body frame 101. Through an exhaust pipe, exhaust gas generated after burning inside the engine is exhausted from a muffler 117. A fuel tank is mounted to the upper side of the engine unit 116 and is covered with a tank cover 118. A seat 119 is successively provided to the rear of the fuel tank.

A front cowl 120 and a side cowl 121 (exterior members) mainly cover the front portion and the side portion of the vehicle as the exterior of the vehicle. A side cover or a seat cowl 122 covers the rear portion of the vehicle. These exterior members form the appearance form of the vehicle having a so-called streamline shape.

Figure 2:
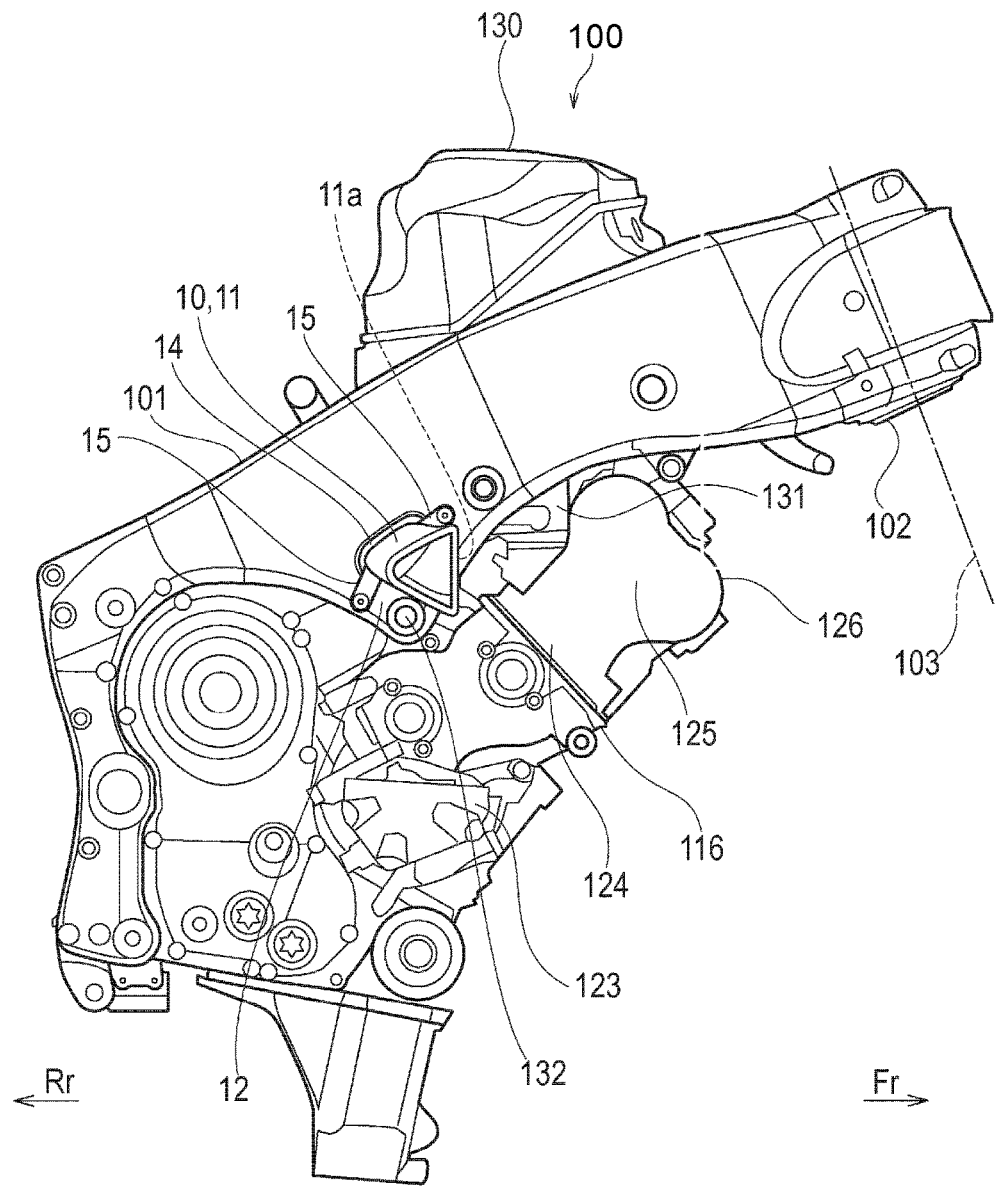
FIG. 2 is a side view illustrating a state where an engine unit is mounted to a vehicle body frame according to the embodiment of the present invention.

In this embodiment, the engine of the engine unit 116 may be, for example, a four-cycle, multicylinder, typically a parallel, four-cylinder engine. As illustrated in FIG. 2, the engine unit 116 in this embodiment is formed by integrally joining a cylinder block 124, a cylinder head 125, and a cylinder head cover 126 in this order together on the upper portion of a crankcase 123. The engine unit 116 is suspended to the vehicle body frames 101 via a plurality of engine mounts to be integrally joined to and supported by the vehicle body frames 101, acting as a rigid member of the vehicle body frames 101 by itself. A transmission case 127 is integrally joined together to the rear portion of the crankcase 123. Also with reference to FIG. 3, a generator (an electric generator) 128 is mounted on the upper side of the crankcase 123.

Figure 3:
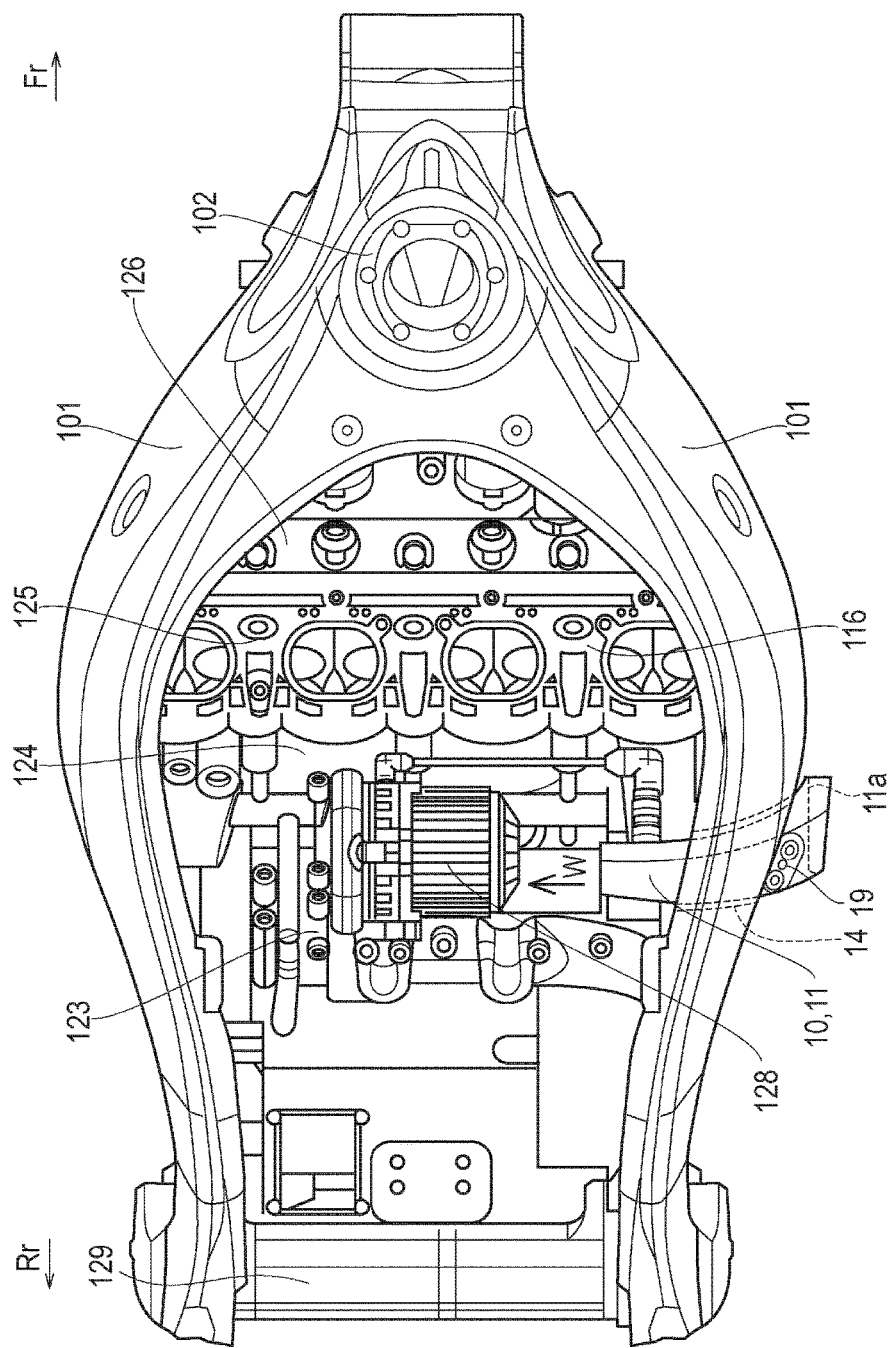
FIG. 3 is a top view illustrating a state where the engine unit is mounted to the vehicle body frame according to the embodiment of the present invention.

In FIG. 2 and FIG. 3, the right and left pair of vehicle body frames 101 extend from the steering head pipe 102 slightly downward to the rear. As illustrated in FIG. 3, the width between mutual right and left inner surfaces of the vehicle body frame 101 gradually increases smoothly from the steering head pipe 102 to the rear. The vehicle body frame 101 partially has an inner space or a space typically with an egg shape or a water droplet shape. As illustrated in FIG. 2, the vehicle body frame 101 has a width in an upper-lower direction around equivalent length to the steering head pipe 102 in the axial direction. The right and left pair of vehicle body frames 101 are formed such that the lower end portion, which is disposed to extend downward to the rear from the steering head pipe 102, is mutually coupled via a bridge member 129 as illustrated in FIG. 3.

As illustrated in FIG. 2 and FIG. 3, an air cleaner 130 (see FIG. 2) is housed and disposed in the inner space or the space, which is formed between the right and left of the vehicle body frames 101. The air cleaner 130 and the engine unit 116, especially the cylinder head 125, are coupled with a throttle body, which constitutes an intake device. As illustrated in FIG. 3, in the parallel, four-cylinder engine in this embodiment, cylinders No. 1 (#1) to No. 4 (#4) are disposed from the left in the right-left (the vehicle width) direction. A throttle body 131 (see also FIG. 2) is coupled to the cylinder head 125 for each cylinder. The intake device suctions air purified by the air cleaner 130, and the fuel supply device supplies fuel. Thus, air-fuel mixture at a predetermined mixing ratio is supplied to an intake port of the cylinder head 125. As apparent from FIG. 2, the air cleaner 130 is positioned above the cylinder head 125. An intake passage, which communicates with the intake port and couples an engine combustion chamber and the air cleaner 130, is provided. As illustrated in FIG. 2, the throttle body 131 is longitudinally disposed in an approximately perpendicular direction, that is, in this example, the throttle body 131 has an air intake structure of a downdraft type.

Figure 4:
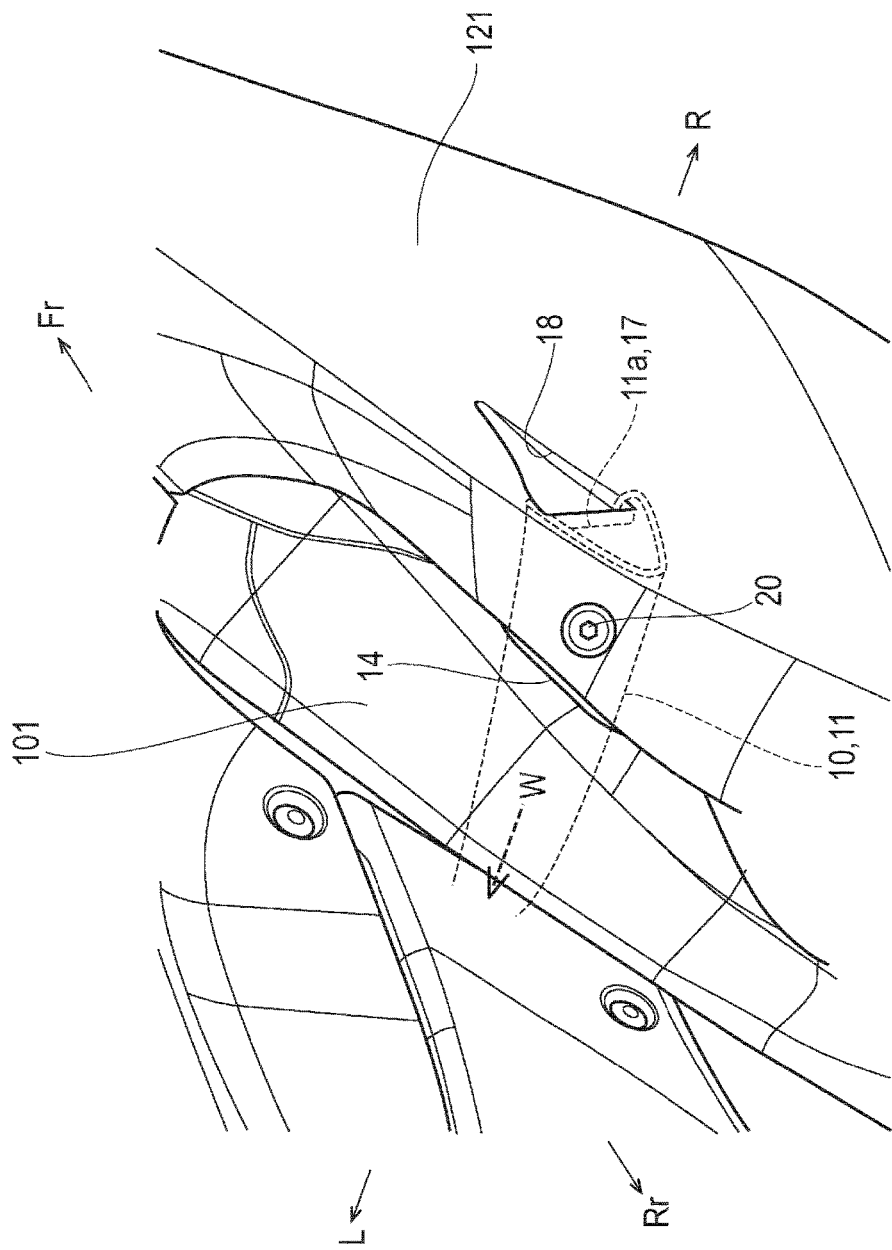
FIG. 4 is a rear perspective view illustrating a periphery of a cowling to which an outside air intake duct according to the embodiment of the present invention is installed.

The motorcycle 100 includes an outside air intake duct. The outside air intake duct takes in air flowing at the outside of the vehicle body and guides the air to the inside the vehicle body. The outside air intake duct, which cools the vehicle components where travelling air does not blow inside the vehicle body of the motorcycle 100 using travelling air, is used to guide the wind to the vehicle components. In this example, target components to be cooled with travelling air are the generator 128, which is mounted above the crankcase 123, and components at the periphery of the generator 128. Although FIG. 1 simplifies the illustration, also with reference to FIG. 2 to FIG. 4, this example includes an outside air intake duct 10 on the right side portion of the vehicle. This embodiment includes the side cowl 121 as the exterior member of vehicle. As illustrated in FIG. 4, the outside air intake duct 10 is disposed inside this side cowl 121.

Specifically, as illustrated in FIG. 3, a duct body 11 of the outside air intake duct 10 extends intersecting with a part of the vehicle body frame 101 in the top view of the vehicle body. To support and secure the duct body 11, the vehicle body frame 101 includes a duct holding portion 12. As illustrated in FIG. 2, FIG. 5, or a similar drawing, the duct holding portion 12 is formed so as to surround this duct body 11 at the intersecting site with the duct body 11. As illustrated in FIG. 2, this duct holding portion 12 forms an engine supporting portion to support the engine (specifically, the crankcase 123) of the engine unit 116 in the vehicle body frame 101. The duct holding portion 12 is formed into an approximately triangular shape so as to cover the whole circumference of the duct body 11. In this case, the duct holding portion 12, which functions as the engine supporting portion, projects downward at the approximately center position of the vehicle body frame 101 in the front-rear direction. The duct holding portion 12 suspends the engine by tightening a predetermined site of the engine with a bolt 132 or a similar member at the apex of the approximately inverted triangle.

Figure 6A:
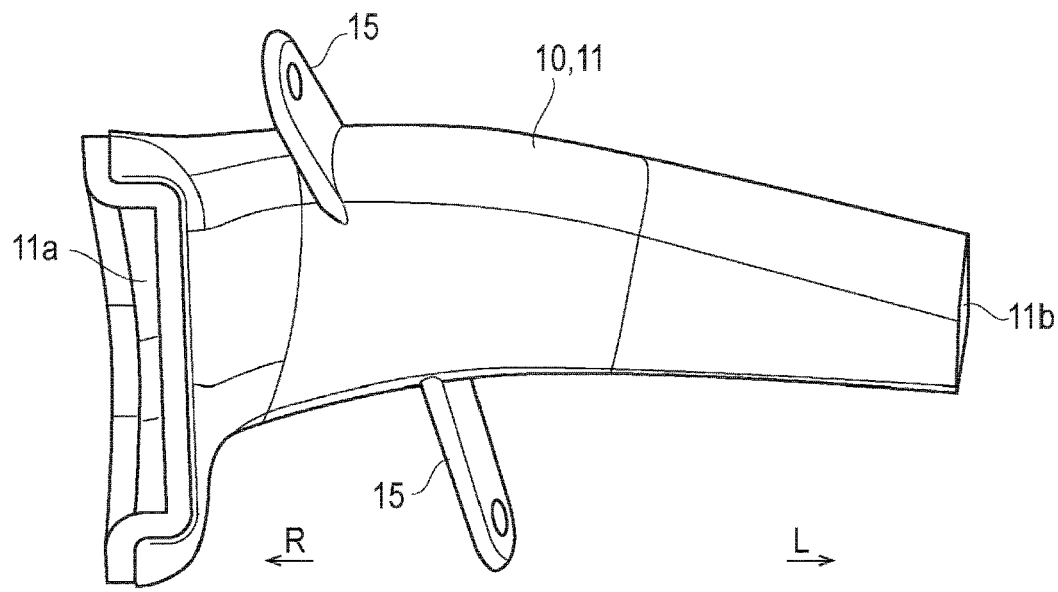
FIG. 6A is a drawing when a duct body according to the embodiment of the present invention is viewed from an approximately front.
Figure 6B:
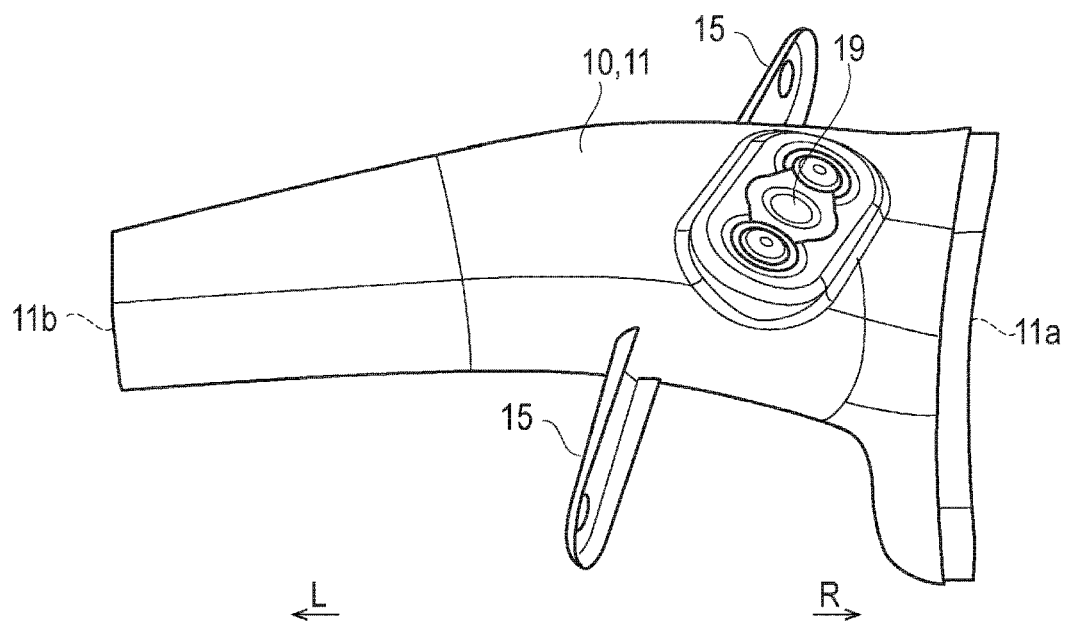
FIG. 6B is a drawing when the duct body according to the embodiment of the present invention is viewed from an approximately obliquely upper rear.

FIG. 6A and FIG. 6B illustrate the duct body 11 according to the embodiment. FIG. 6A is a drawing when the duct body 11 is viewed from an approximately front. FIG. 6B is a drawing when the duct body 11 is viewed from an approximately obliquely upper rear. The duct body 11 has a hollow wall structure formed into an approximately deformed tapered pipe shape and internally includes an intake passage. In this example, the duct body 11 has the following aspects. The duct body 11 has the tapered shape where the one end side of the duct body 11 in the longitudinal direction of the duct body 11 has a large diameter and the other end side has a small diameter. The entire duct body 11 is appropriately curved along the longitudinal direction. An air intake opening 11a is open to the one end side of the duct body 11. This air intake opening 11a is mounted to project to the outside of the vehicle body frame 101, which is the main frame. As apparat from FIG. 5 or a similar drawing, the one end side of the duct body 11 with the large diameter has an approximately triangular shape whose one side faces forward in the side view of vehicle body. As illustrated in FIG. 6A, the opening of the air intake opening 11a has a slit shape long in the upper-and-lower direction. Since the side cowl 121 covers the one end side of the duct body 11, the air intake opening 11a is hardly exposed to the external appearance in side view of the vehicle body. A discharge port 11b is open on the other end side of the duct body 11. This discharge port 11b is positioned inside the vehicle body frame 101 and is mounted to the vehicle body frame 101. The duct body 11 with the approximately triangular shape as described above is configured so as to be gradually flat from the one end side to the other end side of the duct body 11. The discharge port 11b, which opens to the other end side, is formed into an oval shape or an ellipse shape long in the front-rear direction.

As illustrated in FIG. 5, a plurality of duct securing portions 13 are disposed to secure the duct body 11 in the duct holding portion 12. In this example, the pair of duct securing portions 13 are disposed so as to be positioned on both sides of the duct body 11 nipping the duct body 11. In this example, the right vehicle body frame 101 is formed such that the duct holding portion 12 covers the whole circumference of the duct body 11 in a closed curved line shape. That is, the duct holding portion 12 includes a hole 14 into which the duct body 11, which extends intersecting with the vehicle body frame 101, is inserted. The duct body 11 is disposed passing through this hole 14. When mounting to the vehicle, a pair of brackets 15 are attached to the duct body 11. As illustrated in FIG. 5, the brackets 15 are positioned on the side surfaces of the vehicle body frame 101 so as to extend projecting out to the approximately front-rear direction. The distal end portions of the brackets are each tightened to the corresponding duct securing portions 13 with bolts 16 or similar members. Thus, the duct body 11 is mounted to and supported to the vehicle body frame 101.

In this manner, the outside air intake duct 10 extends in the vehicle body width direction in the top view of vehicle body. The duct body 11 intersects with at least one of the right and left vehicle body frames 101, the right vehicle body frame 101 in this example, and the air intake opening 11a opens to the outer lateral side of the right vehicle body frame 101. As illustrated in FIG. 5 or a similar drawing, in the duct holding portion 12, the duct securing portions 13 are formed so as to be approximately opposed on both sides of the cross section of the intake passage of the duct body 11. In this case, typically one of the pair of duct securing portions 13 is formed so as to be positioned on the front side of the duct body 11 and the other is positioned on the rear side of the duct body 11. The distal end portions of the front and rear brackets 15 are each secured with the bolts 16.

Figure 7:
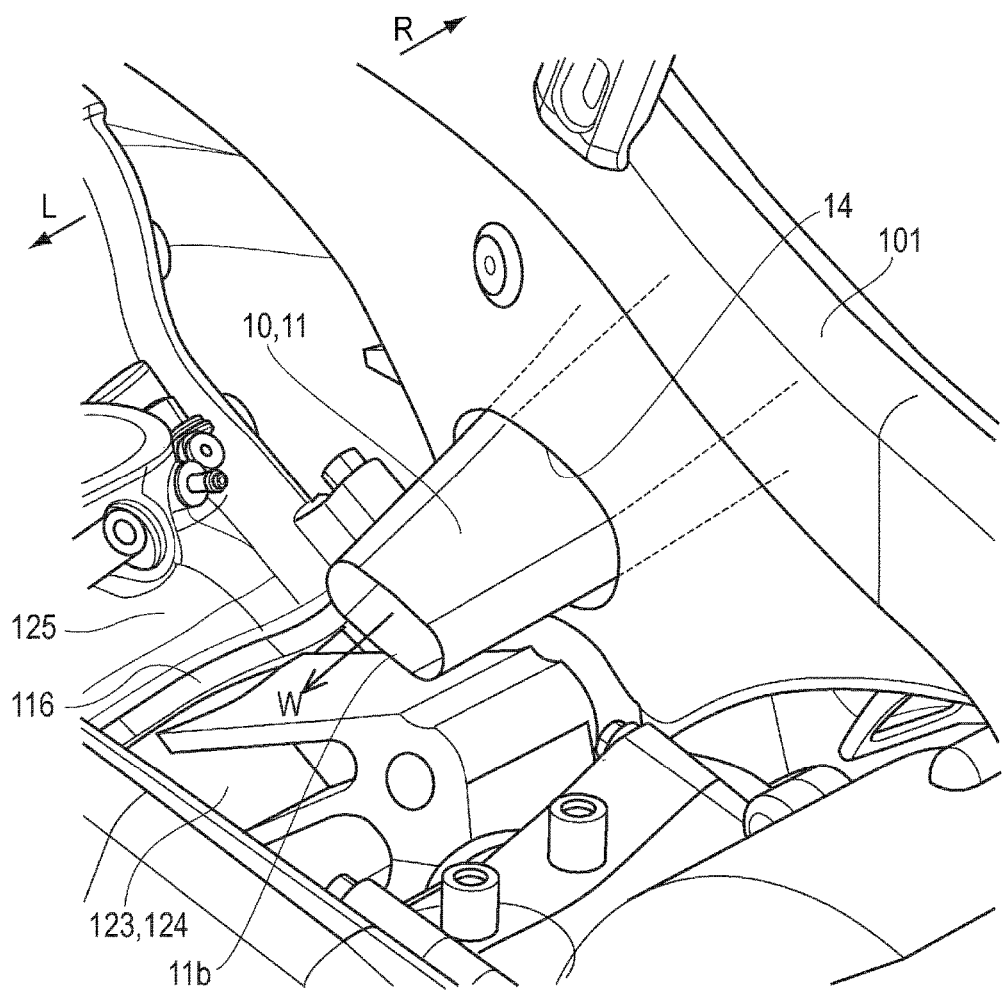
FIG. 7 is a perspective view illustrating the periphery of the outside air intake duct mounted to the vehicle body frame according to the embodiment of the present invention.
Figure 8:
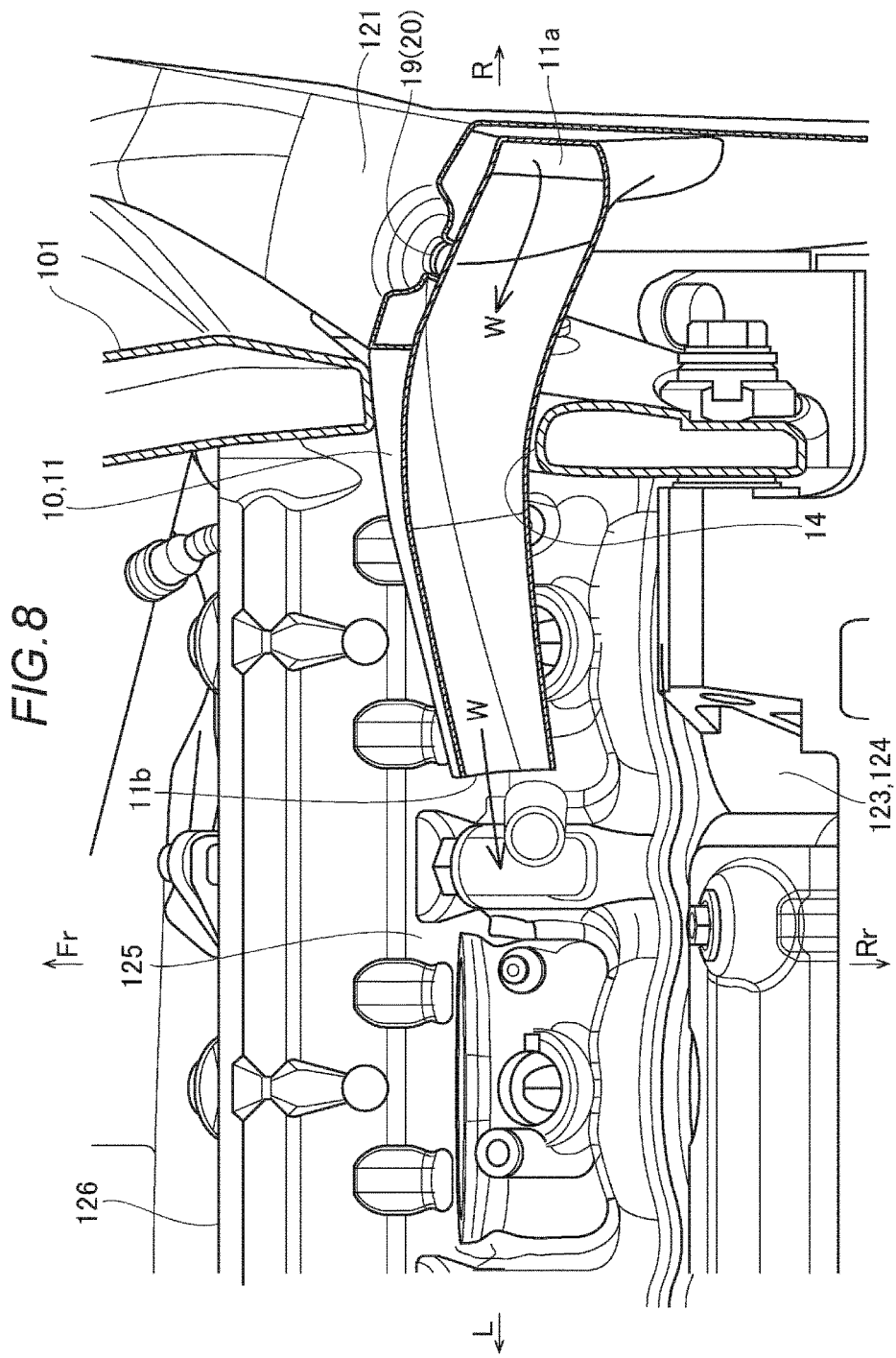
FIG. 8 is a cross-sectional view illustrating the periphery of the outside air intake duct mounted to the vehicle body frame according to the embodiment of the present invention.

As described above, as illustrated in FIG. 7 and FIG. 8, the duct body 11 passes through the hole 14 of the right vehicle body frame 101, and the discharge port 11b is disposed to extend so as to be positioned inside the vehicle body frame 101. The generator 128 is disposed on the extended line of the discharge port 11b, that is, the travelling air suctioned from the air intake opening 11a is discharged from the discharge port 11b. This ensures guiding the wind to the generator 128 and at the periphery of the generator 128. In the following description, airflow is indicated by an arrow W in each drawing as necessary.

Additionally, although the side cowl 121, which is the exterior member, is abbreviated by the dotted line in FIG. 4, the side cowl 121 includes an inlet 17 to take in the air flowing at the outside of the vehicle body. The side cowl 121 includes a recess 18. The recess 18 is formed by sinking the front part from the site corresponding to the air intake opening 11a of the duct body 11 into the approximately triangular shape having its apex on the front end. Then, by forming an opening on the corresponding site of the air intake opening 11a in the side cowl 121, the inlet 17 is disposed. The recess 18 is formed so as to be gradually deeper from the front end to the rear side of the approximately triangular shape. The inlet 17 is disposed to be open such that the corresponding site of the air intake opening 11a has a shape matching this air intake opening 11a. Accordingly, the air intake opening 11a of the duct body 11 communicates with the inlet 17 of the side cowl 121. That is, the air flowing at the outside of the vehicle body is suctioned from the air intake opening 11a via the inlet 17.

The duct body 11 includes an exterior member securing portion (referred to as a cowl securing portion) to secure the side cowl 121, which is the exterior member. In this example, as illustrated in FIG. 5, a cowl securing portion 19 is configured on the top surface portion of the duct body 11 projecting to the outer lateral side of the right vehicle body frame 101. As illustrated in FIG. 4, the side cowl 121 is placed such that the top end surface portion of the side cowl 121 covers the cowl securing portion 19. The top end surface portion is secured with a bolt 20.

The outside air intake duct 10 of the present invention is configured as described above, and the following describes main advantageous effects or similar effects. First, the plurality of duct securing portions 13 are disposed to secure the duct body 11 in the duct holding portion 12. In this example, the pair of duct securing portions 13 are disposed so as to be positioned on both sides of the duct body 11 nipping the duct body 11. The vehicle body frame 101 surrounds the duct body 11, which guides the travelling air to the inside of the vehicle, and the duct securing portions 13 are disposed so as to nip the duct body 11. This strongly secures the duct body 11, namely, the outside air intake duct 10, to the vehicle body frame 101. In this manner, strongly securing the outside air intake duct 10 reliably holds the outside air intake duct 10 against an impact, vibrations, or a similar problem of the vehicle body of the motorcycle 100, always ensuing appropriately guiding the travelling air suctioned with the air intake opening 11a during travelling the vehicle from the discharge port 11b to the generator 128 and the periphery of the generator 128 (see the arrows W in FIG. 3, FIG. 4, FIG. 7, and FIG. 8) and ensuing efficiently cooling the generator 128 and the periphery.

The outside air intake duct 10 extends in the vehicle body width direction in the top view of vehicle body. The duct body 11 intersects with at least one of the right and left vehicle body frames 101, the right vehicle body frame 101 in this example, and the air intake opening 11a opens to the outer lateral side of the right vehicle body frame 101.

By disposing the air intake opening 11a of the outside air intake duct 10 on the lateral side of the vehicle body, for example, while shorting a duct length especially with respect to the cooling target components disposed on the center portion and the rear portion of the vehicle body, the wind can be appropriately guided.

In the duct holding portion 12, the duct securing portions 13 are formed so as to be approximately opposed on both sides of the cross section of the intake passage of the duct body 11. Securing the duct body 11 on both sides of the cross section of the intake passage restrains a flap of the duct body 11 or a similar error, ensuring securing the outside air intake duct 10 with more certainty.

Typically one of the pair of duct securing portions 13 is formed so as to be positioned on the front side of the duct body 11 and the other is positioned on the rear side of the duct body 11.

By disposing the duct securing portions 13 of the duct body 11, which receives the travelling air from the front side of the vehicle, so as to be distributed to the front and rear in the front-rear direction where the travelling air is received ensures directly receiving wind pressure of the travelling air by especially the rear duct securing portion 13. This restrains the flap of the duct body 11 or a similar error, ensuring securing the outside air intake duct 10 with more certainty.

The vehicle body frame 101 is formed such that the duct holding portion 12 covers the whole circumference of the duct body 11 in a closed curved line shape.

Thus configuring the duct holding portion 12 in the closed curved line shape increases the support rigidity compared with the case of, for example, being formed into an arm shape. That is, the duct holding portion 12 includes the hole 14 into which the duct body 11, which extends intersecting with the vehicle body frame 101, is inserted. This allows securing the outside air intake duct 10 with further higher support rigidity.

The duct holding portion 12 forms the engine supporting portion of the engine unit 116. The duct holding portion 12 is formed into the approximately triangular shape so as to cover the whole circumference of the duct body 11.

In this manner, the engine supporting portion having high rigidity and strength in the vehicle body frame 101 is the duct holding portion 12. In this respect as well, the outside air intake duct 10 can be secured with higher support rigidity.

Further, the air intake opening 11a of the duct body 11 communicates with the inlet 17 of the side cowl 121. The air flowing at the outside of the vehicle body is suctioned from the air intake opening 11a via the inlet 17.

With the motorcycle 100 that includes the cowling, which is the exterior member covering the outside of the vehicle body, the cowling, the cowl securing portion 19 to the side cowl 121 in this example, is disposed on the outside air intake duct 10. The air intake opening 11a of the duct body 11 is aligned with the inlet 17 of side cowl 121 so as to be gaplessly formed mutually and secured. This enhances a suction efficiency of travelling air and ensures configuring the air intake opening 11a at minimum necessary dimensions. Accordingly, the travelling resistance can be substantially reduced. The hollow, tubular duct body 11 supports the cowling, which is the exterior member. This causes the duct body 11 to function as a stay featuring lightweight and high rigidity, ensuring supporting the exterior member stronger.

While the present invention has been described using various embodiments above, the present invention is not limited only to these embodiments. Changes and similar modification are possible within the scope of the present invention.

The outside air intake duct 10 may be disposed intersecting with the respective both right and left vehicle body frames 101.

According to the present invention, the vehicle body frame surrounds the duct body, which guides the travelling air to the inside of the vehicle, and the duct securing portions are disposed so as to nip the duct body. This strongly secures the outside air intake duct to the vehicle body frame. Strongly securing the outside air intake duct reliably holds the outside air intake duct against an impact, vibrations, or a similar problem of the vehicle body, always ensuing appropriately guiding the travelling air suctioned with the air intake opening during travelling the vehicle from the discharge port to the generator and the periphery of the generator and ensuing efficiently cooling the generator and the periphery.

What is claimed is:
1. A saddle-ride vehicle, comprising:
a vehicle body frame that includes a right and left pair of main frames, the main frames extending backward from a rear portion of a head pipe to a rear portion of the vehicle body frame, the head pipe being positioned at a front side of a vehicle body; and
an outside air intake duct that takes in air flowing at an outside of the vehicle body and guides the air to an inside of the vehicle body, wherein:
the outside air intake duct includes a duct body that extends intersecting with a part of the vehicle body frame in a top view of the vehicle body,
the vehicle body frame includes a duct holding portion, the duct holding portion being formed so as to surround the duct body at an intersecting site with the duct body,
the duct body includes an air intake opening and a discharge port, the air intake opening projecting outside the vehicle body frame, the discharge port being positioned inside the vehicle body frame, the duct holding portion includes a plurality of duct securing portions to tighten and secure the duct body to the vehicle body frame, the duct securing portions being disposed so as to be positioned on both sides of an intake passage in the duct body holding portion, the outside air intake duct extends in a width direction of the vehicle body in the top view of the vehicle body, the duct body intersecting with at least one of the right and left pair of main frames, the air intake opening to a lateral side projecting outside of one of the main frames with which the duct body intersects, the air intake opening being disposed on a lateral side of the vehicle body, and one of the main frames with which the duct body intersects includes the duct holding portion.

2. The saddle-ride vehicle according to claim 1, wherein in the duct holding portion, the duct securing portions are formed so as to be approximately opposed on both sides of a cross section of an intake passage of the duct body.

3. The saddle-ride vehicle according to claim 1, wherein one of the duct securing portions is formed so as to be positioned on a front side of the duct body, the other duct securing portion being positioned on a rear side of the duct body.

4. The saddle-ride vehicle according to claim 1, wherein one of the main frames with which the duct body intersects is formed such that the duct holding portion covers a whole circumference of the duct body in a closed curved line shape.

5. The saddle-ride vehicle according to claim 4, wherein in one of the main frames with which the duct body intersects, the duct holding portion forms an engine supporting portion to support an engine, the duct holding portion being formed into an approximately triangular shape so as to cover the whole circumference of the duct body.

6. The saddle-ride vehicle according to claim 1, wherein in one of the main frames with which the duct body intersects, the duct holding portion forms an engine supporting portion to support an engine, the duct holding portion being formed into an approximately triangular shape so as to cover a whole circumference of the duct body.

7. The saddle-ride vehicle according to claim 1, further comprising
an exterior member that includes an inlet, the inlet taking in air flowing at the outside of the vehicle body, wherein
the air intake opening of the duct body communicates with the inlet of the exterior member, the duct body including an exterior member securing portion to secure the exterior member.

8. A saddle-ride vehicle, comprising:
a vehicle body frame that includes a right and left pair of main frames, the main frames extending backward from a rear portion of a head pipe to a rear portion of the vehicle body frame, the head pipe being positioned at a front side of a vehicle body; and
an outside air intake duct that takes in air flowing at an outside of the vehicle body and guides the air to an inside of the vehicle body, wherein:
the outside air intake duct includes a duct body that extends intersecting with a part of the vehicle body frame in a top view of the vehicle body,
the vehicle body frame includes a duct holding portion, the duct holding portion being formed so as to surround the duct body at an intersecting site with the duct body,
the duct body includes an air intake opening and a discharge port, the air intake opening projecting outside the vehicle body frame, the discharge port being positioned inside the vehicle body frame, and
the duct holding portion includes a plurality of duct securing portions to secure the duct body, the duct securing portions being disposed so as to be positioned on both sides of an intake passage in the duct body, and
one of the duct securing portions is formed so as to be positioned on a front side of the duct body, the other duct securing portion being positioned on a rear side of the duct body.

9. A saddle-ride vehicle, comprising:
a vehicle body frame that includes a right and left pair of main frames, the main frames extending backward from a rear portion of a head pipe to a rear portion of the vehicle body frame, the head pipe being positioned at a front side of a vehicle body; and
an outside air intake duct that takes in air flowing at an outside of the vehicle body and guides the air to an inside of the vehicle body, wherein:
the outside air intake duct includes a duct body that extends intersecting with a part of the vehicle body frame in a top view of the vehicle body,
the vehicle body frame includes a duct holding portion, the duct holding portion being formed so as to surround the duct body at an intersecting site with the duct body,
the duct body includes an air intake opening and a discharge port, the air intake opening projecting outside the vehicle body frame, the discharge port being positioned inside the vehicle body frame, and
the duct holding portion includes a plurality of duct securing portions to secure the duct body, the duct securing portions being disposed so as to be positioned on both sides of an intake passage in the duct body,
an exterior member that includes an inlet is disposed, the inlet taking in air flowing at the outside of the vehicle body, and
the air intake opening of the duct body communicates with the inlet of the exterior member, the duct body including an exterior member securing portion to secure the exterior member.

10. The saddle-ride vehicle according to claim 9, wherein the exterior member securing portion has a structure to which the exterior component is secured with a fastening member.

* * * * *